United States Patent
Langner

[11] Patent Number: 5,823,691
[45] Date of Patent: Oct. 20, 1998

[54] METHOD AND APPARATUS FOR PRODUCING EMBOSSED IMAGES

[75] Inventor: Peter S. Langner, Corvallis, Oreg.

[73] Assignee: The State of Oregon Acting by and through the State Board of Higher Education on Behalf of Oregon State University, Corvallis, Oreg.

[21] Appl. No.: 857,475

[22] Filed: May 15, 1997

Related U.S. Application Data

[60] Provisional application No. 60/017,793, May 15, 1996.

[51] Int. Cl.[6] .................................................. B41J 3/38
[52] U.S. Cl. .......................... 400/127; 101/18; 400/131; 400/135
[58] Field of Search .................................. 101/18, 19, 21, 101/12, 13, 15, 16, 17, 26, 32; 400/120.01, 118.2, 127, 129, 130, 131, 132, 134, 135; 434/113, 114, 115

[56] References Cited

U.S. PATENT DOCUMENTS

| | | | |
|---|---|---|---|
| 3,880,269 | 4/1975 | Carbonneau | 101/18 |
| 4,285,275 | 8/1981 | Sato | 101/407.1 |
| 4,600,320 | 7/1986 | Hoovler et al. | 400/122 |
| 4,676,676 | 6/1987 | Bitoh | 400/120 |
| 4,735,516 | 4/1988 | Galarneau | 400/122 |
| 5,193,921 | 3/1993 | Tsukuda et al. | 400/122 |
| 5,204,802 | 4/1993 | Howes, Jr. et al. | 361/154 |
| 5,222,819 | 6/1993 | Tsukuda et al. | 400/122 |
| 5,313,256 | 5/1994 | Bov, Jr. et al. | 355/282 |
| 5,341,732 | 8/1994 | Landers | 101/3.1 |
| 5,502,965 | 4/1996 | Hornhauer et al. | 60/326 |

FOREIGN PATENT DOCUMENTS

| | | | |
|---|---|---|---|
| 61-31272 | 2/1986 | Japan | 400/127 |
| 61-280967 | 12/1986 | Japan . | |
| 5-286183 | 11/1993 | Japan . | |

OTHER PUBLICATIONS 5-286183

*Primary Examiner*—Christopher A. Bennett
*Attorney, Agent, or Firm*—Klarquist Sparkman Campbell Leigh & Whinston, LLP

[57] ABSTRACT

An embossing device, which can produce traditional braille cells and crisp, well-defined, raised images of graphical subjects is disclosed. Embossing of sheet material is accomplished using punches which have embossing faces shaped to mate with recessed areas on the surface of a platen.

14 Claims, 10 Drawing Sheets

METHOD AND APPARATUS FOR PRODUCING EMBOSSED IMAGES

This invention was made with support from the National Science Foundation, contract number HRD-9452881. The government has certain rights in this invention.

This application claims the benefit of U.S. Provisional Application No. 60/017,793, filed May 15, 1996.

BACKGROUND OF THE INVENTION

The present invention relates to a method and apparatus for embossing paper, particularly to produce images to be read by persons who are visually impaired.

Automated embossing systems have existed for a number of years. Primarily, these are devices for embossing letters or dots into a sheet of paper or plastic material, such as for embossing lettering into credit card blanks. Among these products are a number of braille printers which use embossing heads which produce patterns of embossed dimples or dots corresponding to the braille alphabet. Prior embossing machines are described in U.S. Pat. Nos. 4,676,676, 5,193,921, 5,204,802, 5,222,819, and 5,313,256.

Such prior devices have not, however, been suitable for producing both high resolution graphical images and braille cells which can be read by a visually impaired person.

SUMMARY OF THE INVENTION

The present invention is an embossing device which can produce crisp, well-defined images in a suitable sheet material, such as stiff paper. The device can produce embossed images of graphical subjects such as maps, drawings and the like, in addition to producing traditional six or eight dot braille cells and Dotsplus braille cells.

Embossing is accomplished using punches, chisels, and/or roller punches, referred collectively as tools. These tools have embossing faces which are shaped to mate with recessed areas on the surface of a platen. In order to emboss a medium, such as paper, with the embossing tools, a certain minimum force must be applied to overcome the resistance of the medium. This force is supplied most efficiently by an electromechanical device such as a solenoid. Other actuators, such as pneumatic cylinders, could be used to drive the tools, but solenoids are less expensive, smaller and more reliable.

A typical embosser according to the present invention is capable of producing dots and line segments having an embossed height of about 0.5 millimeters, with dots having vertical and horizontal spacings of about 1.2 millimeters.

The invention will best be understood with reference to the accompanying drawings and detailed description.

DETAILED DESCRIPTION

Figure 1:
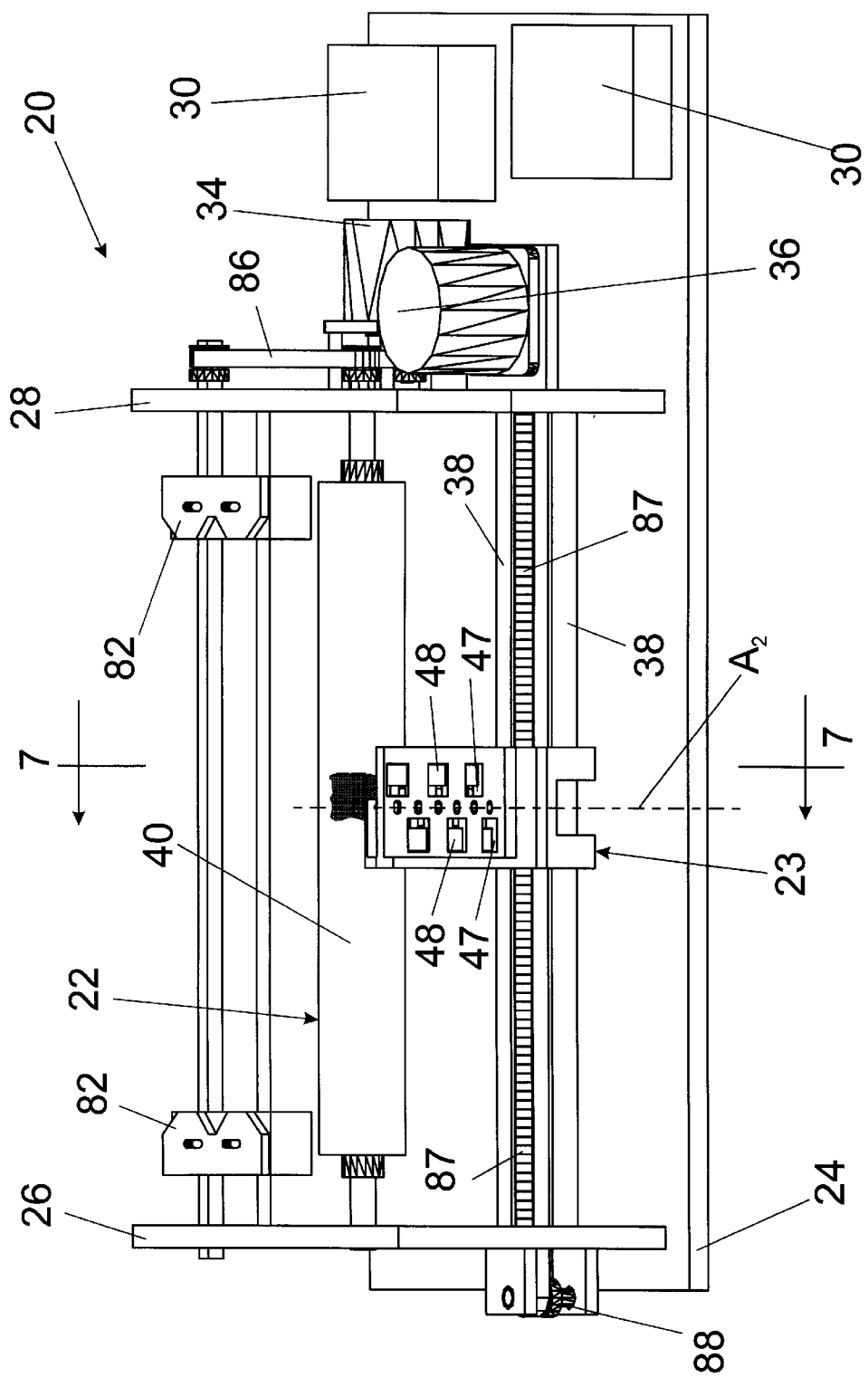
FIG. 1 is an oblique view of an embossing apparatus including a punch and die system according to the present invention.
Figure 2:
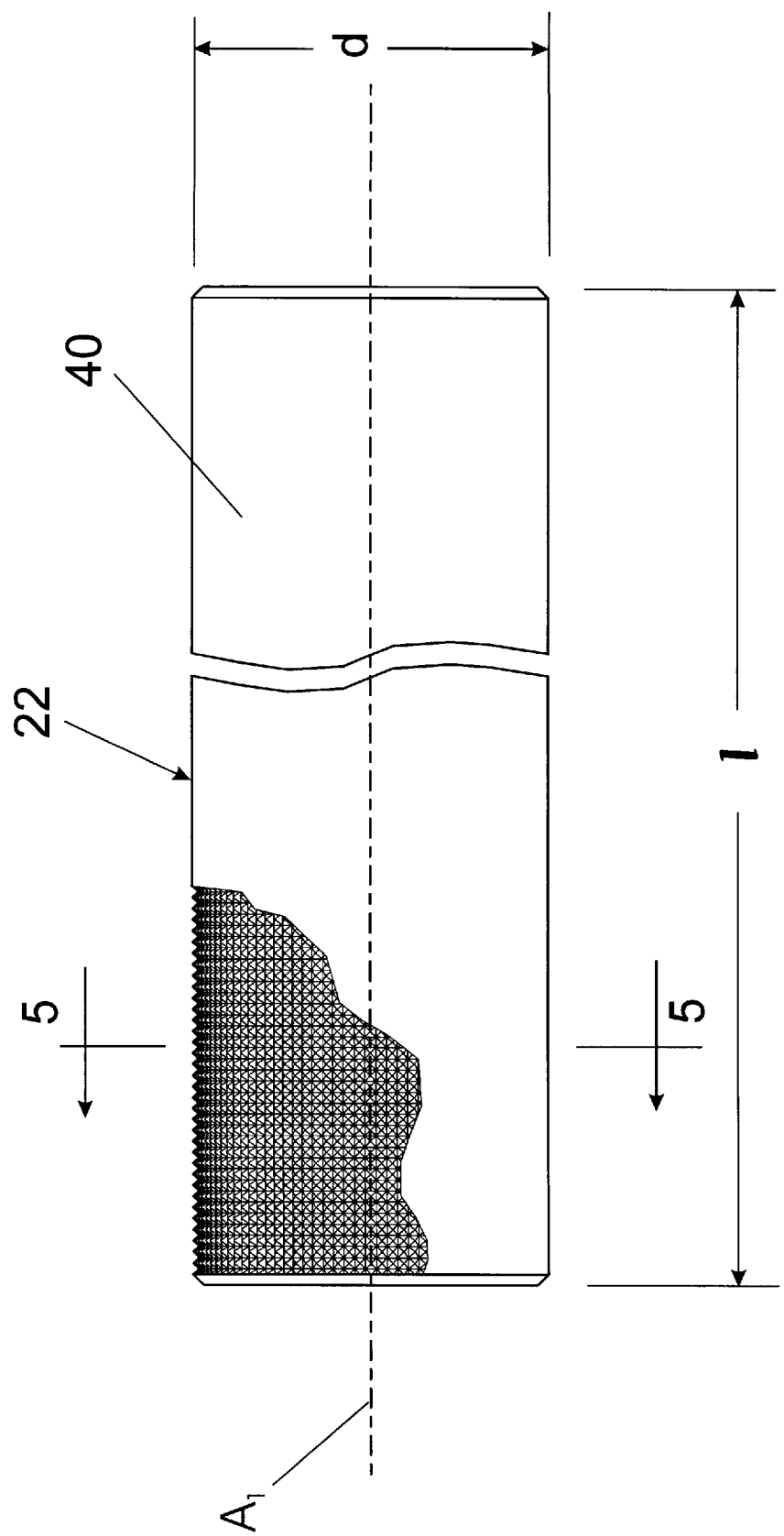
FIG. 2 is an enlarged, front elevational view of a roller die shown in FIG. 1.
Figure 3:
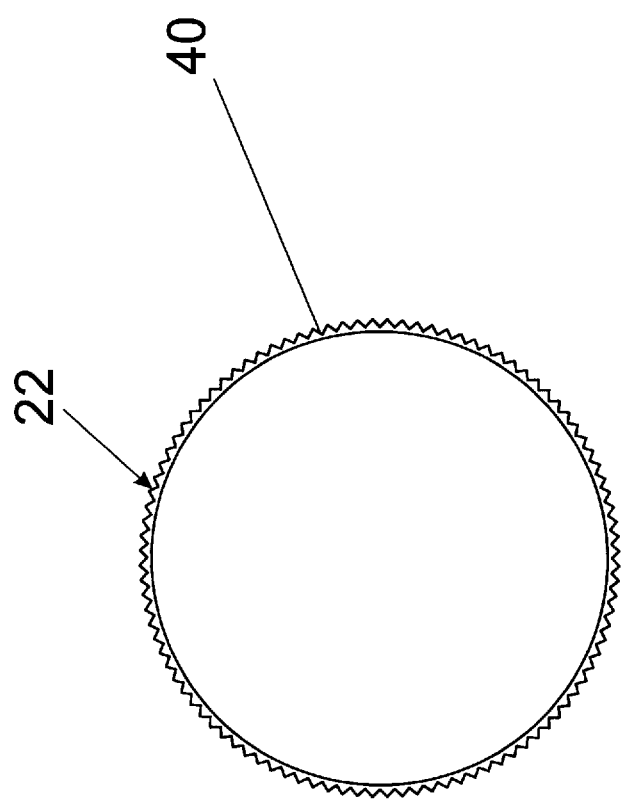
FIG. 3 is a side elevational view of the roller die of FIG. 2.

To produce a high-resolution image comprised of raised areas in a sheet, an embosser according to the present invention includes a unique embossing head and platen mechanism.

A preferred embosser according to the present invention, which in many ways can operate similarly to a traditional dot matrix printer, can be constructed using components, such as drive mechanisms and electrical controls, which are commonly found in dot matrix printers. Such commonly-known elements are shown schematically in the drawings, but are not described herein in detail since they are familiar to those skilled in the art.

Unlike dot matrix printers, the embosser 20 shown in FIGS. 1–8 of the drawings does not have a rubber roller platen which supports paper to be printed. In place of a rubber roller, the embosser has a metal roller die 22, which is sometimes referred to herein as a roller platen. And, unlike the print heads of traditional printers, the embosser 20 has an embossing head 23 which is designed to mount several types of embossing tools, some of which are unique in design.

The embosser 20 can be used to impress raised areas, such as crisp, sharp dots and vertical and horizontal line segments. These raised areas can be impressed on braille paper, inexpensive plastic sheets, or any other medium which can be deformed by punches and which holds its shape thereafter. In the following discussion, a sheet of paper is the workpiece described, but it should be understood that other embossable materials could be used in place of paper.

Referring to FIG. 1, a preferred embodiment of the invention comprises a frame including a base 24, left side wall 26, and right side wall 28. Mechanical and electrical elements, such as circuit boards 30, motors 34, 36, and various guide bars, are secured to the frame. These include guide bars 38 which slidably extend through openings 39 in the base of the embossing head 23 to support the embossing head. Cable connectors are provided to electrically connect motor and solenoid control circuits on the circuit boards 30 to a port of a digital computer (not shown).

The platen 22 extends between and is rotatably mounted on the sidewalls 26, 28. The platen has a surface 40 with elevated and depressed regions. The depressed regions are shaped to mate with the faces of various types of punches. For example, the illustrated platen 22, which is a hard metal cylinder, has a surface 40 with depressed regions which are referred to herein as valleys or channels 42, 44. The walls of these channels are shaped to mate with faces of punches which are shaped to produce raised round dots and raised line segments respectively. In particular the channels are v-shaped grooves with centerlines spaced at uniform 1.275 mm intervals.

Figure 4:
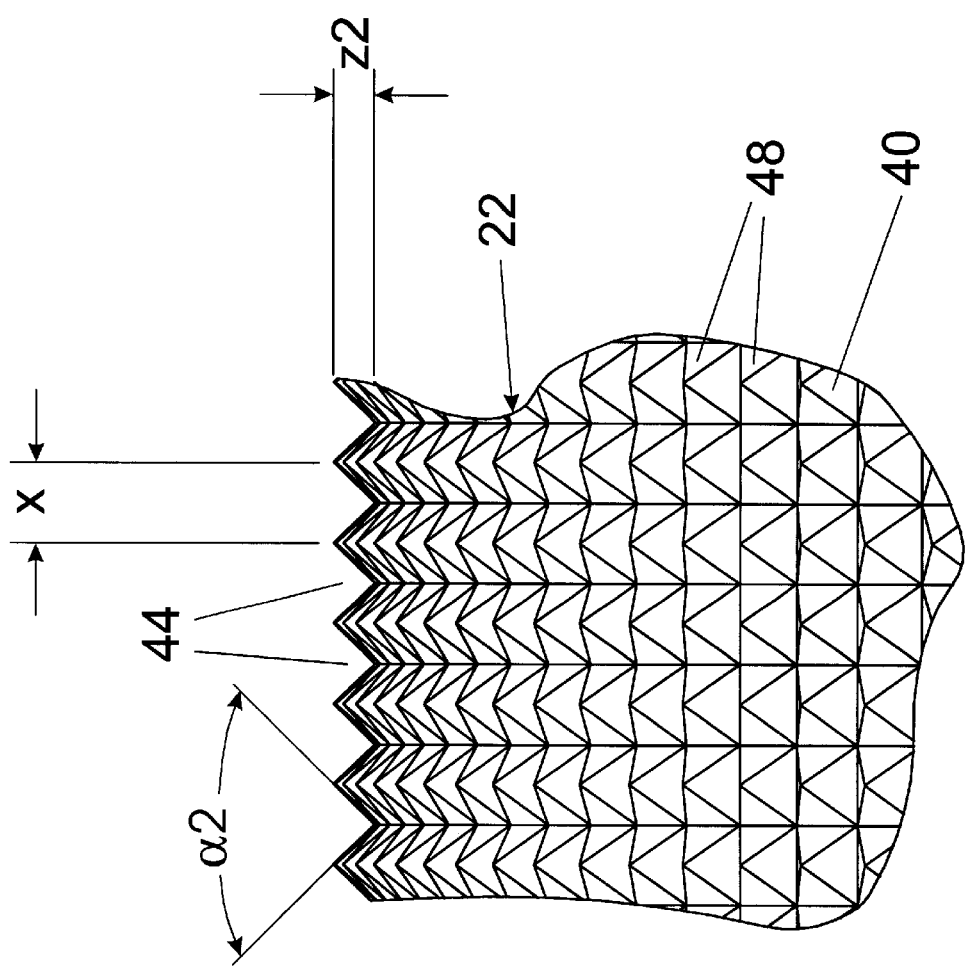
FIG. 4 is an enlarged, partial view of the roller die of FIG. 2.
Figure 5:
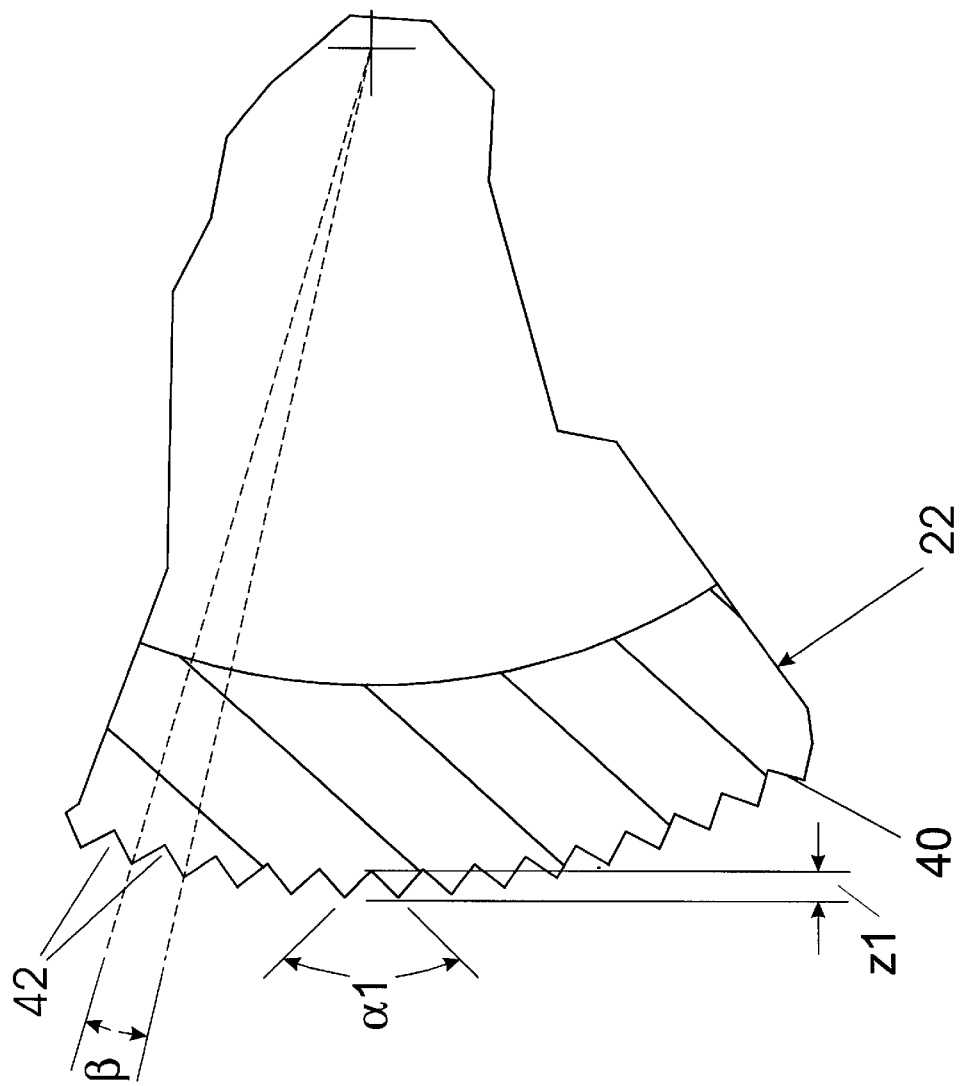
FIG. 5 is an enlarged, partial sectional view taken along line 5—5 of FIG. 2.
Figure 6:
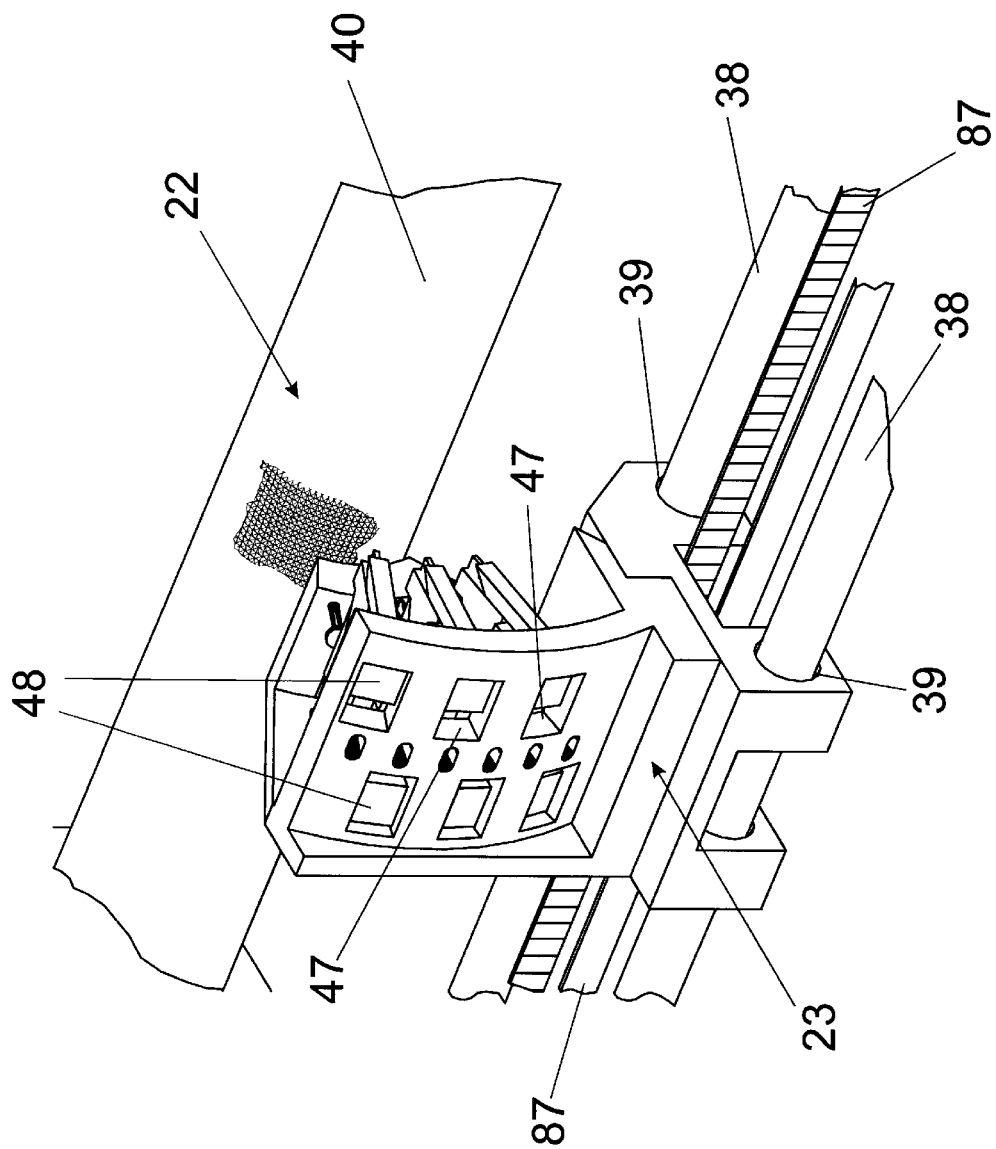
FIG. 6 is an enlarged, partial oblique view of a roller die and print head of FIG. 1.
Figure 7:
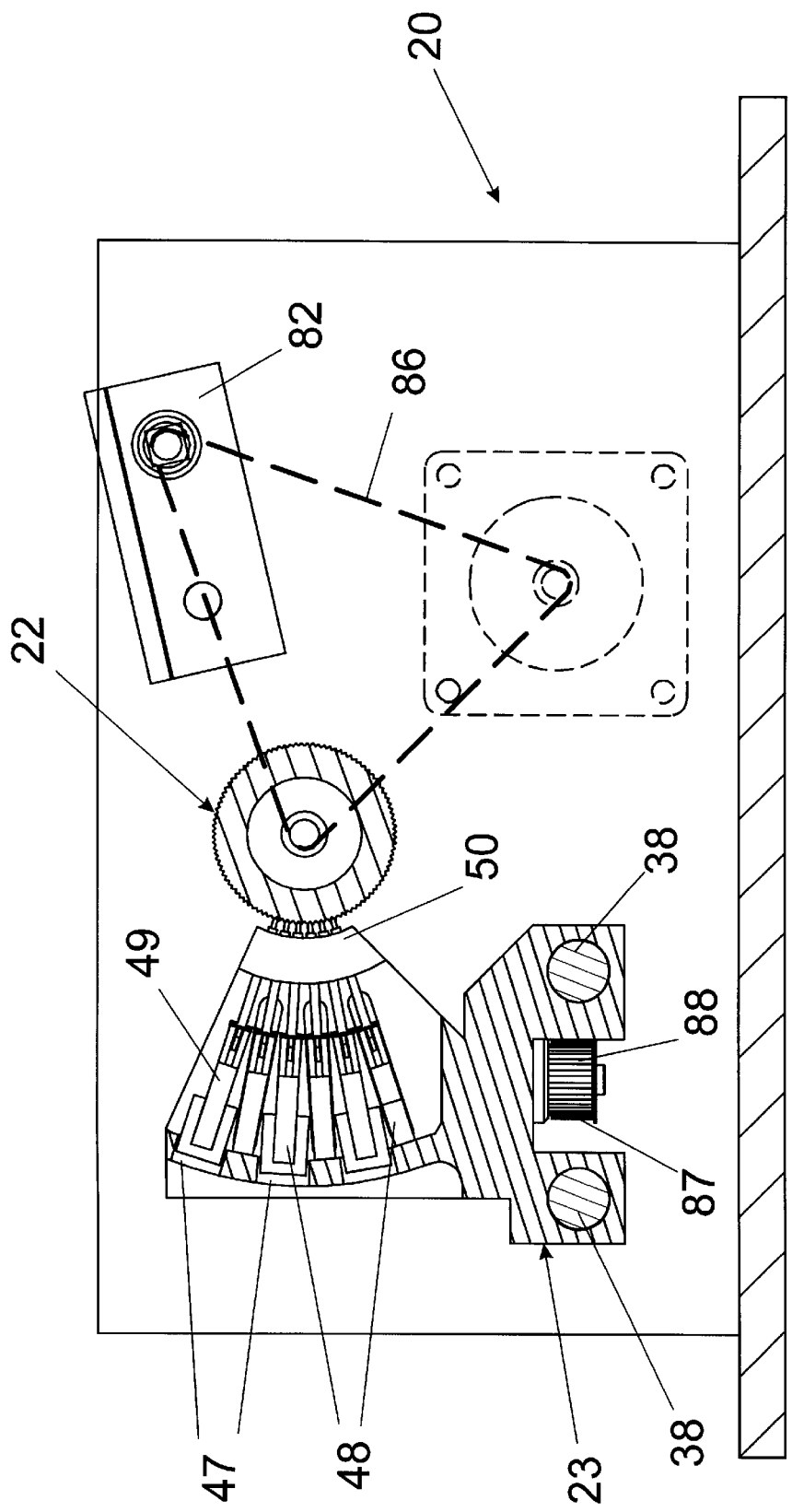
FIG. 7 is an enlarged sectional view taken along line 7—7 of FIG. 1.

Such grooves are formed in the roller platen 22 in an array comprising two sets of parallel grooves. The first set consists of multiple parallel grooves 42 which extend parallel to the axis $A_1$ of roller platen rotation. The second set consists of multiple parallel grooves 44 which extend around the circumference of the platen 22 and intersect the grooves 42 of the first set at right angles. The surface 40 of the die is thus a grid of axial grooves 42 and circumferential grooves 44, the grooves of each set being evenly spaced. As shown in FIG. 4, the surface 40 appears as a tightly packed array of four-sided pyramids 46 arranged in straight axial and circumferential rows. The vertices of the pyramids are the elevated regions of the platen surface 40. Other surface arrangements are possible, but the illustrated arrangement is believed to be the most useful and is relatively easy to manufacture.

Referring to FIGS. 2–5, the dimensions of a suitable roller platen are as follows:

length l: the length of the roller platen can be chosen as needed; since the standard braille paper size is (width× length) 11.5×11 inches (292.1×279.4 mm) the length of a suitable roller platen is about 300 mm (l=300 mm).

diameter d: the diameter d of the roller platen depends on the number of horizontal grooves (=grooves parallel to the axial direction); in a prototype model, d=40.584 mm.

angle $\alpha 1$, $\alpha 2$: the open angle of the grooves could be varied in order to get sharp structures embossed into the used medium; both angles should be the same ($\alpha 1 = \alpha 2$); in the prototype model: $\alpha 1 = \alpha 2 = 90°$.

depths $z1$, $z2$: the depths of the horizontal and vertical grooves determine the height of the structure embossed into the medium and should be equal: $z1=z2$; for standard braille z should be about 0.5 mm; in the prototype model: $z1=z2=0.6375$ mm.

angle $\beta$: the angle $\beta$ is used to specify the radial distances of the horizontal grooves; together with the number of horizontal grooves around the circumference and the diameter of the roller platen the maximal resolution in the vertical direction on the medium (e.g., paper) is specified; in the prototype model $\beta = 3.6°$; together with the number of horizontal grooves N=100 and the diameter of the roller platen the distance between two horizontal grooves is 1.275 mm.

distance x: the distance x between the vertical grooves determines the maximal resolution in the horizontal direction on the medium (e.g., paper); in the prototype model x=1.275 mm.

The illustrated embossing head 23 is designed to operate in conjunction with the platen 22. The embossing head 23 has mounting openings 47 to receive six punch mechanisms 48. The openings are spaced uniformly from one another along a vertical axis $A_2$, and arranged in a staggered array, with one half of the openings centered on each side of the axis $A_2$.

Installed in each opening is a punch mechanism 48 including a solenoid 49, a chuck 50, and a tool mounted in the chuck. Four adjacent punch mechanisms have dot punches; the other two have horizontal and vertical line punches, respectively. With this arrangement, four horizontal lines of braille dots can be impressed during a single pass of the embossing head, along with single lines of horizontal and vertical line segments. It will be appreciated that more, fewer and/or different punches could be mounted on a single embossing head or that multiple embossing heads could be used.

Crisp lines with sharp tops are generally easier to distinguish quickly from braille dots than are lines with rounded tops. Thus, an embosser capable of printing sharp continuous lines and well-defined braille dots is needed in order to make readable tactile materials with braille words and small graphics.

The illustrated embosser 20 can produce graphic images which are particularly easy to distinguish from braille dots. This is achieved by using at least two punch mechanisms which have different tools with different faces to emboss raised areas which are different in shape or texture. In particular, one type of punch is used to produce a dot and another type of punch, having an elongated edge, is used to produce vertical and horizontal line segments. The various actuators are operated at different locations along the sheet to impress multiple raised areas which together form the image.

Figure 8:
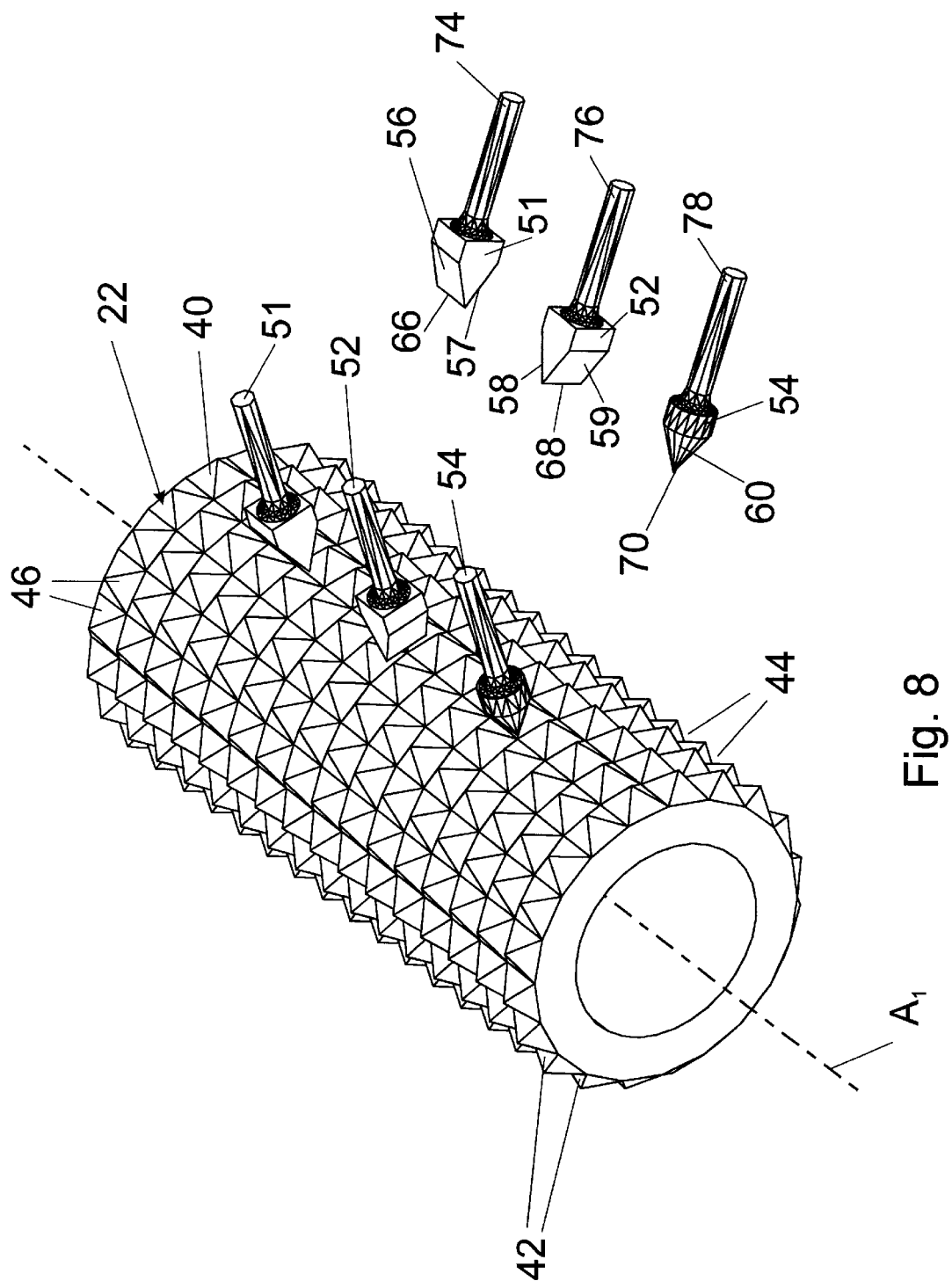
FIG. 8 is an enlarged, schematic oblique view of the roller die of FIG. 2 and mating punches.

This is most easily accomplished with a configuration, as shown if FIG. 8, where the embosser has at least one horizontal chisel-shaped punch 51, one vertical chisel-shaped punch 52, and one punch 54 suitable for making dots. In the illustrated embodiment, the punch 51 has a head portion with an embossing face 56, 57 which tapers to define an elongated edge 66. Similarly, the punch 52 has a head portion with an embossing face 58, 59 which tapers to define an elongated edge 68. The edges are 1.275 mm in length to produce line segments which are 1.275 mm in length. The edge 66 extends parallel to the axial grooves 42, while the edge 68 extends parallel to planes which contain the circumferential grooves 44. The punch 54 has a head with an embossing face 60 which is conical, tapering to a slightly rounded point 70. The tools have stems 74, 76, 78 which extend from a punch's head in a direction opposite the punch's embossing edge or point.

By employing the chisel-shaped punches 51, 52, the embosser can produce both vertical and horizontal lines which are essentially perfectly smooth. Line segments which are not horizontal or vertical can be printed as a zig-zag series of vertical and horizontal dots and/or line segments. These are not smooth, but have good tactile resolution. Zig-zag diagonal line segments produced by a prototype embosser have a tactile crispness equal to or better than the best presently available from other devices.

The shape of the dots and line segments embossed is determined by the shape of the punches. A punch which is a sharp cone produces dots with broken tips similar to the dots produced by most present braille embossers. Chisel-shaped punches may also break the paper at the top if the punches have embossing faces which taper to sharp edges. Punches with a more rounded tip or edge will produce dots or line segments which are somewhat broader, but which do not break a paper sheet.

Special purpose punches (not shown) could be used for certain projects. For example, if creating a chart, special purpose punches could be used to produce a variety of different types of dashed line segments and/or waffle-like textured regions. To make a dashed line, one can use a chisel-shaped punch with a face having two short, collinear edges instead of one long edge 66. Regions of contrasting texture can be used to distinguish the nature of different regions of an embossed graphic, in the manner that color is used to distinguish different political jurisdictions on an ordinary map. The textures are chosen so that a reader can tactually sense the difference between the raised areas.

Figure 9:
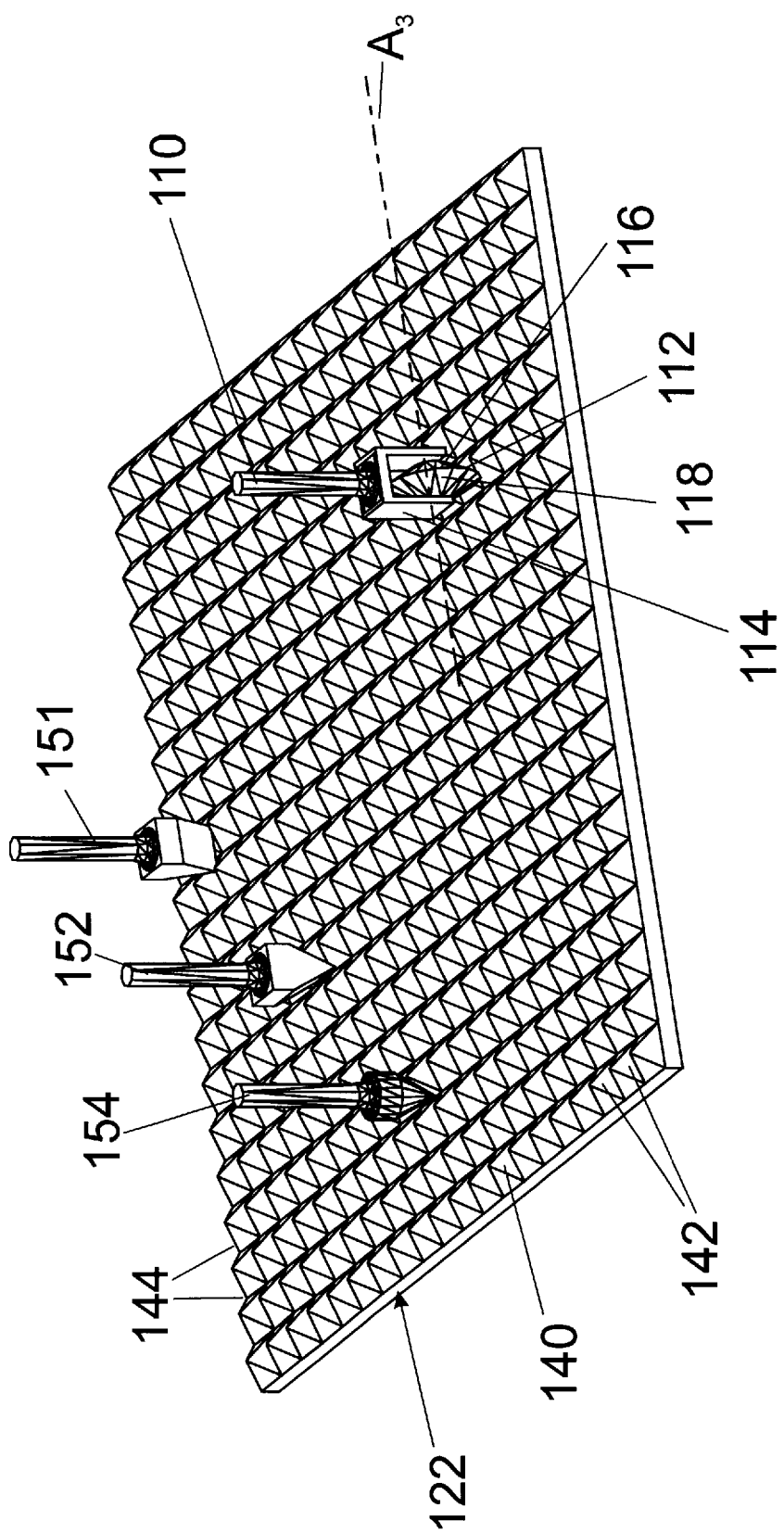
FIG. 9 is a schematic oblique view of another embossing apparatus including a punch and die system according to the present invention.
Figure 10:
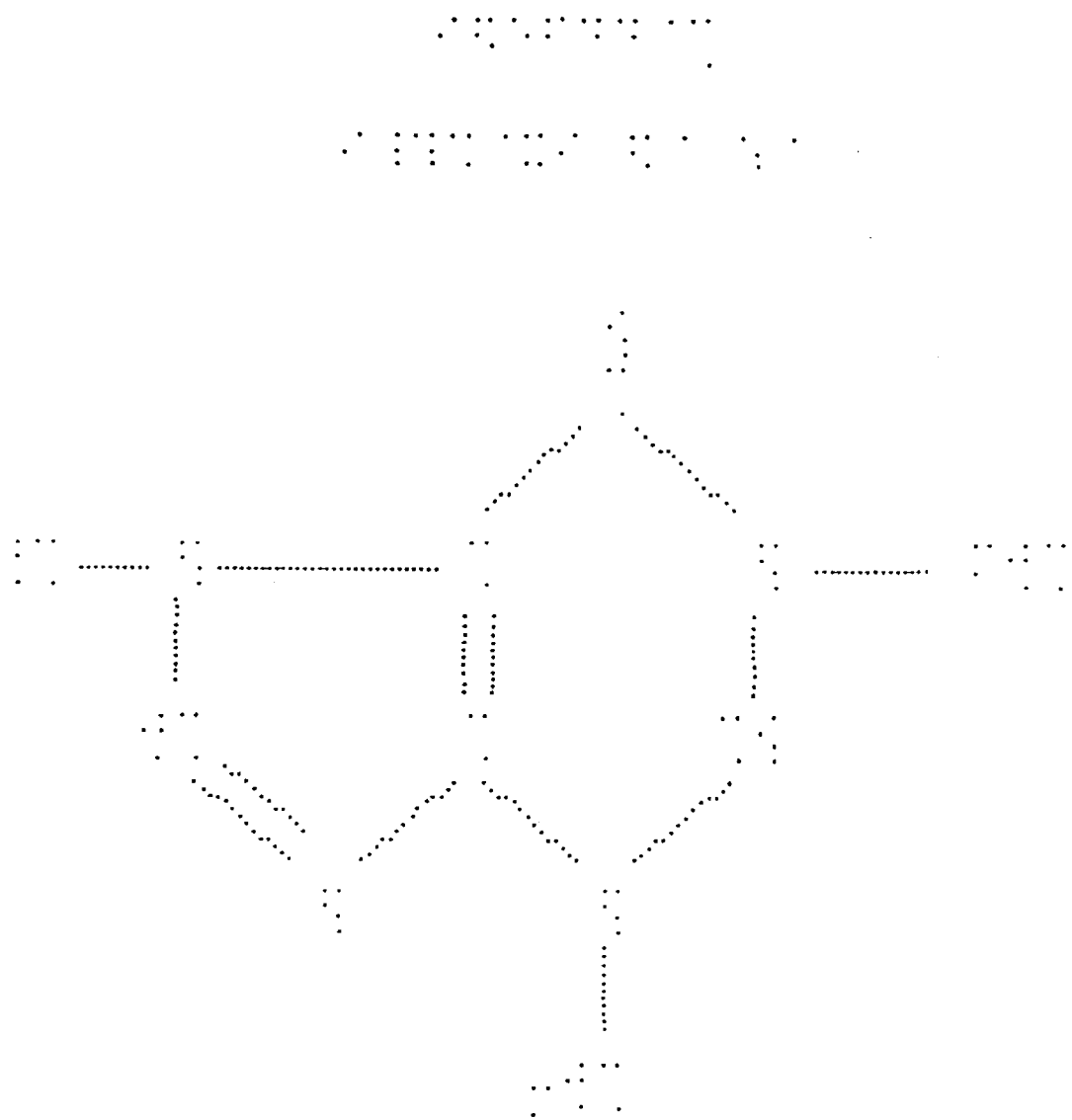
FIG. 10 illustrates a pattern of embossing which can be produced by an embosser according to the present invention.

An alternative style of line segment punch is shown in FIG. 9. This wheel punch 110 employs an embossing wheel which has faces 116, 118 which taper to an circumferential edge 112, such that the wheel is v-shaped in cross-section near the edge. The wheel is mounted in a fork 114 to rotate about a wheel axis $A_3$. FIG. 9 shows such a wheel punch 110 being used with a planar platen which is discussed below. Such a punch also can be used with the embosser shown in FIGS. 1–8. The embossing faces 116, 118 are shaped to be received into one of the circumferential channels 44 or axial channels 42 of the roller platen 22.

A wheel punch is desirable because it has an elongated edge 112 which can produce a long, straight line segment by moving in relation to the platen while pressure is being applied. To provide a vertical line on a sheet of paper with the embosser of FIGS. 1–8, the wheel is oriented so that it can roll in one of the circumferential channels 44 and the print head is moved horizontally (axially in relation to the platen 22) to a position selected to align the wheel with a desired channel. The associated solenoid is activated to push the punch so that the wheel is moved into the channel with a sheet of paper therebetween. Next the roller platen 22 and paper feed mechanism are operated in tandem such that the wheel moves along the channel and presses a line segment into the advancing or retracting sheet. Similarly, if a horizonal line is desired, a wheel punch is oriented to be received in an axial channel 42 of the roller platen 22, the associated solenoid is actuated so that the wheel punch presses a sheet of paper into the channel 42, and the print head is then moved horizontally (axially in relation to the platen 22) for a desired distance so that the wheel rolls along the channel 42 and presses a horizontal line segment of suitable length into the sheet.

For mechanical simplicity, two chisel-shaped punches or two wheel punches can be used to produce vertical and horizontal lines respectively. As an alternative, a single chisel-shaped punch or a single wheel punch can be used to produce both types of lines. Such a dual purpose punch would be mounted on a rotatable chuck (not shown) such that rotation of the chuck would cause the punch to rotate about the longitudinal axis of its stem. The rotation pattern would be set such that the wheel punch could be rotated between two positions. In a first position the axis $A_3$ would extend parallel to the axis $A_1$ and the punch edge 112 would extend vertically in the apparatus of FIGS. 1–8. In the second position the axis $A_3$ would extend parallel to a tangent to the surface of the roller platen 22 and the punch edge 112 would extend horizontally in the apparatus of FIGS. 1–8.

The illustrated punches are inserts. The stem of each punch is received in the socket of a chuck 50 which is a part of one of the punch mechanisms 48. This type of punch can be easily replaced so that a user can choose a punch face shaped to his/her personal preference and/or use a different set of punches, as needed, for plastic, paper, or other special medium. This also allows for easy replacement of worn punches. It is best for the platen 22 to be made of a material which is harder than the material used to make the punches, so that the platen is less susceptible to wear.

It is also advantageous for embossers of the present invention to incorporate a standard dot matrix or ink jet print head (not shown) so that visible equivalents of braille symbols can be printed alongside. In this way, the resulting pages can be read by both visually impaired and fully sighted persons.

The illustrated embodiment includes positioning apparatus, including apparatus to move the paper and the printing head, so that the embossing faces can be positioned to emboss the paper at desired locations. The positioning apparatus is constructed so that the print head 23 can reliably be positioned, relative to the platen 22, at locations where the face of a desired tool is located opposite a depressed region of the platen. The tool is thus positioned to press the sheet into that depressed region. The sheet is positioned relative to the print head and platen so that embossing occurs at a desired location on the sheet.

As in dot matrix printers, paper to be embossed can be positioned by movement of a pin feed mechanism 82 or pinch rollers (not shown). The paper feed mechanism, including a stepper motor 34, is adapted to move the paper in steps of 1.275 mm corresponding to the groove spacing on the die. The roller die 22 is keyed to the pin feed mechanism by a belt 86 or other linkage so that the surface 40 of the roller die travels past the embossing head 23 at the same speed as the paper when the paper is being moved. The embosser 20 can incorporate paper drive and sensor mechanisms of the type found in dot matrix printers.

A stepper motor 36 or equivalent drive mechanism likewise is employed to move the embossing head horizontally in steps of 1.275 mm. A toothed belt 87 extends as a loop around a toothed gear (not shown) driven by the motor and around an idler 88 at the opposite side wall 26 of the embosser chassis. One side of the looped belt 87 is attached to the embossing head 23 so that operation of the motor 36 causes the belt to move and drag the embossing head horizontally along the bars 38. Both horizontal and vertical movement can be at smaller steps, if necessary, to compensate for punch spacings on the embossing heads.

In the illustrated embosser, the paper is advanced and the embossing head 23 moves horizontally across the paper, under computer control, so that the punches can be activated at any desired position on the face of the paper. The resolution of the embosser 20 is equal to the groove spacing of the platen 22.

The height of embossed images will vary depending upon the amount punching force applied by the solenoids 49 and, to some extent, the thickness of the sheet to be embossed. The amount of punching force is determined by the amount of electrical current applied to the solenoids and the duration of current supply. Thus, a greater elevation is achieved when a greater amount of electrical current is applied. The maximum embossing height is determined by the depth of the valleys in the platen.

An actuator control mechanism, such as a circuit to adjust electrical current applications or a mechanical device to position the embossing head nearer or farther from the sheet, can be provided to adjust the height of embossing. An electrical current adjustment mechanism, under control of the computer, is most versatile. Such a mechanism can rapidly adjust the amount of force at which an embossing face presses into a sheet, which determines the height of an embossed raised area. Thus, by varying the amount of force applied by an actuator in response to instructions from the computer, it is possible to encode additional information, communicated by the height of the embossing, into embossed structures. At a minimum, the embosser should be sufficiently adjustable that dot punches can be made to produce braille cells having dots at the accepted 0.5 mm height and 2.5 mm spacing.

Useful relief patterns can be obtained by operating the actuators at multiple positions along the sheet to produce an embossed image comprised of multiple raised areas of differing heights. The amount of force applied by the actuator is adjusted from location to location such that at least some of the raised areas are of a height that is different than the height of other of the raised areas produced by the same punch mechanism.

Embossers according to the present invention can be used with digital computers (not shown) in the manner of existing computer embossers. The control program will be very similar to programs used for controlling dot matrix printers. Thus, embossers according to the present invention will work with the existing Windows and Macintosh application software by loading a suitable printer driver into the computer memory. Printer driver programs are well known and can easily be prepared for any printing device, including an embosser according to the present invention. Standard word processing and graphics program can print to the embosser according to the present invention. The embosser will perform like a dot matrix printer except that when a vertical line segment is desired, a single punch will be activated instead of a vertical row of print head pins, and, when a horizontal line is desired, a single punch will be actuated instead of a horizontal line of print head pins. Software for operating the embosser should include support for the LaTeX system if the embosser is to be used for printing information in the fields of science, engineering and mathematics, since LaTeX is currently the most practical way for a visually impaired person to write the needed figures.

Embossers according to the present invention are capable of impressing both braille cells and clear graphics images in a single document. Standard graphics software can be used to make the graphics. The letters of words which are written on the user's display screen by such software can automatically be embossed as braille cells. This is accomplished by the use of braille look-up tables which can be provided in firmware for the embosser, in a similar manner as such tables have been provided in prior braille printing devices.

Having illustrated the principles of my invention with reference to a preferred embodiment, it should be apparent to those skilled in the art that such an invention may be modified in arrangement and detail without departing from the principles. For example, the punch and roller die system could be incorporated into the body of a typewriter instead of a computer printer. The typewriter embodiment would be programmed to provide immediate reaction to key strokes such that when a key was depressed, a corresponding punch or punches would be activated to emboss a character or dot or line segment. Such typewriter could also incorporate the features commonly found in electrical typewriters such as document memory, spell checking, and the like.

As another alternative, in either a printer or typewriter embodiment, the print head could have a daisy wheel configuration (not shown) where a single solenoid is used to strike a selected pedal of a daisy wheel. Each pedal could bear a particular type of embossing face, so that numerous embossing effects could be accomplished using a single wheel.

In yet another alternative, a series of many punches could be spaced along a print head which is a fixed bar which extends the length of the embosser roll so that the print head would not move in relation to the embosser chassis. The punches could be arranged in a staggered array so the horizontal spacing of the punches could be very close or even overlapping. In this embodiment a design would be applied to a planar sheet by advancing the sheet to a desired position in relation to the bar, and then actuating those punches needed to produce the design. The sheet would then be moved up an increment and the next appropriate set of punches actuated.

It will also be appreciated that for some purposes, an embosser could be configured in the form of a plotter. This type of embosser, as illustrated in FIG. 9, would have planer platen 122 with an upper surface 140 being a grid of at least two sets of parallel channels 142, 144. A embosser head (not shown), bearing one or more punches 110, 151, 152, 154, would be moved over the surface 140 in the manner of a print head of an x-y plotter. The computer's printer driver would be programmed to position the embossing head so that punches are positioned at desired locations over mating channels 142, 144. A sheet of paper (not shown) would be positioned between the platen 122 and the punches 110, 151, 152, 154. The print head would move to a position where a punch was in a desired location to emboss a mark, and then the punch's solenoid would be actuated to press the punch into the paper at that position. In the case of a wheel punch 110, the embossing head would then be moved, in a direction normal to the wheel axis $A_3$ and parallel to a channel receiving the wheel punch, to impress an extended line segment.

Special purpose embossing devices can be made according to the present invention. For example, small sized embossers according to the present invention can be used in label embossers and in ATM machines. Relief maps can be made using embossers which have actuators with sufficiently long ranges of motion and a control mechanism to adjust the height of embossing.

Accordingly, I claim as my invention all such modifications as come within the true spirit and scope of the following claims:

I claim:

1. An embosser for forming raised areas in a planar sheet, the embosser comprising:

an embosser platen having a surface which includes an array of elevated and depressed regions;

an embossing head that is movable relative to the platen and that bears at least one punch mechanism comprising an embossing tool having an embossing face and an actuator to move the tool toward the platen while the face of the tool is located opposite one of the depressed regions of the platen and while a sheet to be embossed is located between the platen and the head; and a positioning apparatus which includes a motor to vary the location of the embossing head relative to the sheet and to the platen such that the embossing face is positioned opposite one of the depressed regions of the platen to emboss the sheet at a desired location.

2. The embosser of claim 1 wherein the positioning apparatus is adapted to move the platen, the embossing head and the sheet.

3. An embosser for forming raised areas in a planar sheet, the embosser comprising:

an embosser platen having a surface which includes an array of elevated and depressed regions which comprise a first set of multiple evenly-spaced parallel channels and a second set of multiple evenly-spaced parallel channels;

an embossing head bearing an embossing tool having an embossing face and an actuator to move the tool toward the platen while the face of the tool is located opposite one of the depressed regions of the platen and while a sheet to be embossed is located between the platen and the head; and a positioning apparatus which includes a motor to vary the location of the embossing head relative to the sheet such that the embossing face is positioned to emboss the sheet at a desired location.

4. The embosser of claim 3 wherein the parallel channels of the first set intersect the parallel channels of the second set at right angles.

5. An embosser for forming raised areas in a planar sheet, the embosser comprising:
  an embosser platen having a surface which includes an array of elevated and depressed regions;
  an embossing head having embossing tools which have embossing faces that form dots, vertical line segments, and horizontal line segments, and having at least one actuator to selectively move the tools toward the platen while the face of the tool being moved is located opposite one of the depressed regions of the platen and while a sheet to be embossed is located between the platen and the head; and
  a positioning apparatus which includes a motor to vary the location of the embossing head relative to the sheet such that the embossing faces are selectively positioned to emboss the sheet at desired locations.

6. An embosser for forming raised areas in a planar sheet, the embosser comprising:
  an embosser platen having a surface which includes an array of elevated and depressed regions;
  an embossing head having a tool with an embossing face and an actuator to move the tool toward the platen while the face of the tool is located opposite one of the depressed regions of the platen and while a sheet to be embossed is located between the platen and the head, the embossing face being shaped to produce a raised line segment when the tool is forced into the sheet; and
  a positioning apparatus which includes a motor to vary the location of the embossing head relative to the sheet such that the embossing face is positioned to emboss the sheet at a desired location.

7. An embosser for forming raised areas in a planar sheet, the embosser comprising:
  an embosser platen having a surface which includes an array of elevated and depressed regions;
  an embossing head having a tool which comprises a wheel punch which has an embossing wheel that has an embossing face and that is mounted to rotate about an axis and having an actuator to move the tool toward the platen while the embossing face is located opposite one of the depressed regions of the platen and while a sheet to be embossed is located between the platen and the head; and
  a positioning apparatus which includes a motor to vary the location of the embossing head relative to the sheet such that the embossing face is positioned to emboss the sheet at a desired location and such that the embossing wheel rotates about the axis while the embossing head is moved in relation to the platen and the tool is in contact with the sheet.

8. An embosser for forming raised areas in a planar sheet, the embosser comprising:
  a cylindrical embosser platen having a surface which includes an array of elevated and depressed regions, the depressed regions being a first set of multiple parallel channels and a second set of multiple parallel channels, the first set of channels intersecting the second set of channels at right angles; and
  an embossing head bearing at least one punch mechanism comprising an embossing tool having an embossing face and an actuator to move the tool toward the platen while a sheet to be embossed is located between the platen and the head; and
  a positioning apparatus which includes a motor to move the embossing head to a location, relative to the embosser platen, at which the face of the tool is located opposite one of the depressed regions of the platen.

9. An embosser for forming raised areas in a planar sheet, the embosser comprising:
  an embosser platen;
  an embossing head bearing at least one punch mechanism comprising an embossing tool having an embossing face and an actuator to move the tool toward the platen while a sheet to be embossed is located between the platen and the head, the face of at least one such embossing tool having an elongated edge such that a raised line segment is produced when the edge is forced into the sheet; and
  a positioning apparatus which includes a motor to vary the location of the embossing head relative to the sheet such that the embossing face is positioned to emboss the sheet at a desired location.

10. The embosser of claim 9 wherein the tool having an elongated edge comprises a wheel punch which has an embossing wheel that is mounted to rotate about an axis while the embossing head is moved in relation to the platen and the tool is in contact with the sheet.

11. An embosser for forming raised areas in a planar sheet, the embosser comprising:
  an embosser platen;
  an embossing head bearing at least one punch mechanism comprising an embossing tool having an embossing face and an actuator to move the tool toward the platen while a sheet to be embossed is located between the platen and the head;
  a positioning apparatus which includes a motor to vary the location of the embossing head relative to the sheet such that the embossing face is positioned to emboss the sheet at a desired location; and
  an actuator control mechanism to adjust the amount of force at which the face presses into the sheet so that the height of an embossed raised area can be altered from location to location along the sheet by adjusting the amount of the force applied by the actuator at that area.

12. A method for embossing raised areas into a sheet of material, the method comprising:
  providing an embosser including (a) an embosser platen having a surface which comprises an array of elevated and depressed regions, (b) an embossing head bearing at least one punch mechanism comprising an embossing tool having an embossing face and an actuator to move the tool toward the platen, and (c) a positioning mechanism to vary the position of the embossing head relative to both the platen and to a sheet of material to be embossed;
  positioning a sheet of material to be embossed between the platen and the embossing head;
  positioning the embossing head, the platen, and the sheet relative to one another such that the face is located at a position which is opposite one of the depressed regions of the platen and which is where embossing of the sheet is desired; and
  operating the actuator to supply sufficient force to press the face into the sheet and press a portion of the sheet into the depressed region which is opposite the face.

13. A method for embossing raised areas into a sheet of material, the method comprising:
  providing an embosser including (a) an embosser platen having a surface which comprises an array of elevated and depressed regions, (b) an embossing head bearing multiple embossing tools with each of at least two of the tools having different faces which emboss raised areas which are different in shape or texture and bearing at least one actuator to selectively move the tools toward the platen, and (c) a positioning mechanism to adjust the position of the embossing head relative to a sheet of material to be embossed;

positioning a sheet of material to be embossed between the platen and the embossing head;

positioning the embossing head, the platen, and the sheet relative to one another such that the face of one of the tools is located at a position which is opposite one of the depressed regions of the platen and which is where embossing of the sheet is desired; and selectively moving the tools toward the platen at different locations along the sheet to press the tool faces into the sheet, press portions of the sheet into the depressed regions which are opposite the faces, and produce an embossed graphic image comprised of multiple raised areas, at least some of the raised areas being different in shape or texture than other of the raised areas so that a person can tactually sense a difference between the raised areas.

14. A method for embossing raised areas into a sheet of material, the method comprising:

providing an embosser including (a) an embosser platen having a surface which comprises an array of elevated and depressed regions, (b) an embossing head bearing at least one punch mechanism comprising an embossing tool having an embossing face and an actuator to move the tool toward the platen, and (c) a positioning mechanism to adjust the position of the embossing head relative to a sheet of material to be embossed;

positioning a sheet of material to be embossed between the platen and the embossing head;

positioning the embossing head, the platen, and the sheet relative to one another such that the face is located at a position which is opposite one of the depressed regions of the platen and which is where embossing of the sheet is desired;

operating the actuator at multiple such positions along the sheet to produce an embossed image comprised of multiple raised areas, the amount of force applied by the actuator being adjusted from location to location such that at least some of the raised areas are of a height that is different than the height of other of the raised areas produced by the same punch mechanism.

* * * * *